United States Patent [19]

Steitz et al.

[11] 4,424,071
[45] Jan. 3, 1984

[54] MOLTEN MASS TEMPERATURE CONDITIONER

[75] Inventors: William R. Steitz, Toledo; Richard C. Carle, Grand Rapids, both of Ohio

[73] Assignee: Toledo Engineering Co., Inc., Toledo, Ohio

[21] Appl. No.: 424,426

[22] Filed: Sep. 27, 1982

[51] Int. Cl.³ .............................. C03B 5/24; C03B 7/06
[52] U.S. Cl. .......................................... 65/337; 65/136; 65/346
[58] Field of Search ................ 65/337, 346, 347, 136, 65/137, 29

[56] References Cited

U.S. PATENT DOCUMENTS

| | | | |
|---|---|---|---|
| 1,582,132 | 4/1926 | Delaucuvellerie | 65/98 |
| 1,593,054 | 7/1926 | Arbeit | 373/32 |
| 1,596,058 | 8/1926 | Mambourg | 65/135 |
| 1,598,307 | 8/1926 | Pike | 65/178 |
| 1,669,676 | 5/1928 | Schneider | 65/125 |
| 1,820,247 | 8/1931 | Raeder | 373/33 |
| 1,820,248 | 8/1931 | Raeder | 373/33 |
| 1,841,464 | 1/1932 | Black | 65/135 |
| 1,893,061 | 1/1933 | Peiler | 65/346 |
| 1,904,960 | 4/1933 | Soubier | 65/337 |
| 1,937,390 | 11/1933 | McKinley et al. | 49/54 |
| 1,941,778 | 1/1934 | Amsler | 49/54 |
| 2,049,600 | 8/1936 | Wright | 49/54 |
| 2,064,546 | 12/1936 | Kutchka | 49/54 |
| 2,085,328 | 6/1937 | Peiler | 49/55 |
| 2,098,625 | 11/1937 | Honiss | 49/55 |
| 2,115,408 | 4/1938 | Brosse | 49/55 |
| 2,121,958 | 6/1938 | Forman et al. | 49/83.1 |
| 2,282,554 | 5/1942 | Barker, Jr. | 65/137 X |
| 2,538,956 | 1/1951 | Arbeit | 13/6 |
| 2,583,629 | 1/1952 | Cannon, Jr. | 49/54 |
| 2,610,217 | 9/1952 | Skinner et al. | 13/6 |
| 2,640,859 | 6/1953 | Skinner et al. | 13/6 |
| 2,680,772 | 6/1954 | Skinner et al. | 13/34 |
| 2,808,446 | 10/1957 | Lambert | 65/136 X |
| 2,990,438 | 6/1961 | Lambert et al. | 13/6 |
| 3,183,072 | 5/1965 | Long | 65/347 X |
| 3,248,203 | 4/1966 | Cunningham | 65/326 |
| 3,321,288 | 5/1967 | Griem, Jr. | 65/17 |
| 3,326,655 | 6/1967 | Penberthy | 65/337 X |
| 3,343,935 | 9/1967 | Keefer et al. | 65/121 |
| 3,399,047 | 8/1968 | Brichard | 65/346 |
| 3,420,653 | 1/1969 | Boettner | 65/335 |
| 3,421,876 | 1/1969 | Schmidt | 65/346 |
| 3,445,255 | 5/1969 | Monks, Jr. | 106/52 |
| 3,574,585 | 4/1971 | Robertson et al. | 65/135 |
| 3,640,517 | 2/1972 | Sendt | 263/11 |
| 3,645,712 | 2/1972 | Ihrig et al. | 65/83 |
| 3,658,505 | 4/1972 | Kunkle | 65/337 |
| 3,733,189 | 5/1973 | Zurheide et al. | 65/11 R |
| 3,764,287 | 10/1973 | Brocious | 65/337 X |
| 4,052,186 | 10/1977 | Rhodes | 65/137 |
| 4,207,065 | 6/1980 | Ackermann et al. | 432/195 |
| 4,227,909 | 10/1980 | Hornyak, Jr. et al. | 65/135 |
| 4,294,603 | 10/1981 | Winzer et al. | 65/346 |

Primary Examiner—Arthur D. Kellogg
Attorney, Agent, or Firm—Hugh Adam Kirk

[57] ABSTRACT

A container between the output of a melting furnace wherein the molten mass is also refined, such as for glass, and the ducts to a plurality of forming machines comprising a larger first zone and a plurality of smaller second zones corresponding to each forming machine, in which container the molten mass is controlled in temperature above and below its liquid level as it flows through the first and second zone toward a forming machine so that the cross-sectional area of the molten mass at the outlet duct from each second zone has substantially a uniform temperature. Each zone is provided with temperature control means for both heating and cooling, such as burners and/or electrodes above and below the surface of the molten mass in the conditioner, and fluid jets and/or hollow ducts or panels engageable with the outside walls of the conditioner, so as to establish the desired uniform temperatures throughout the depth and width or cross-section of the molten mass flowing from each outlet duct of the conditioner and to minimize as much as possible convection currents in the conditioner.

6 Claims, 3 Drawing Figures

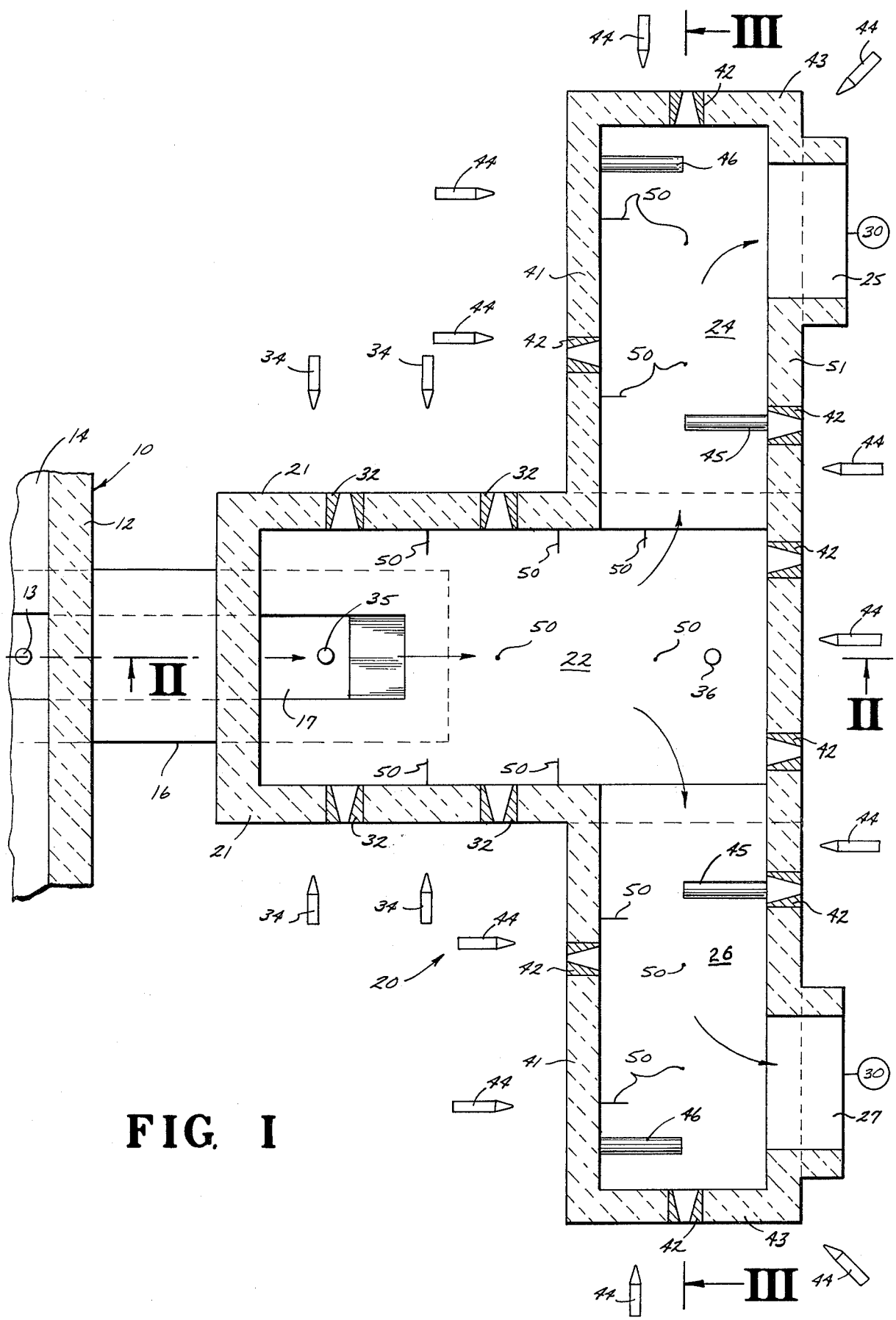
FIG. I

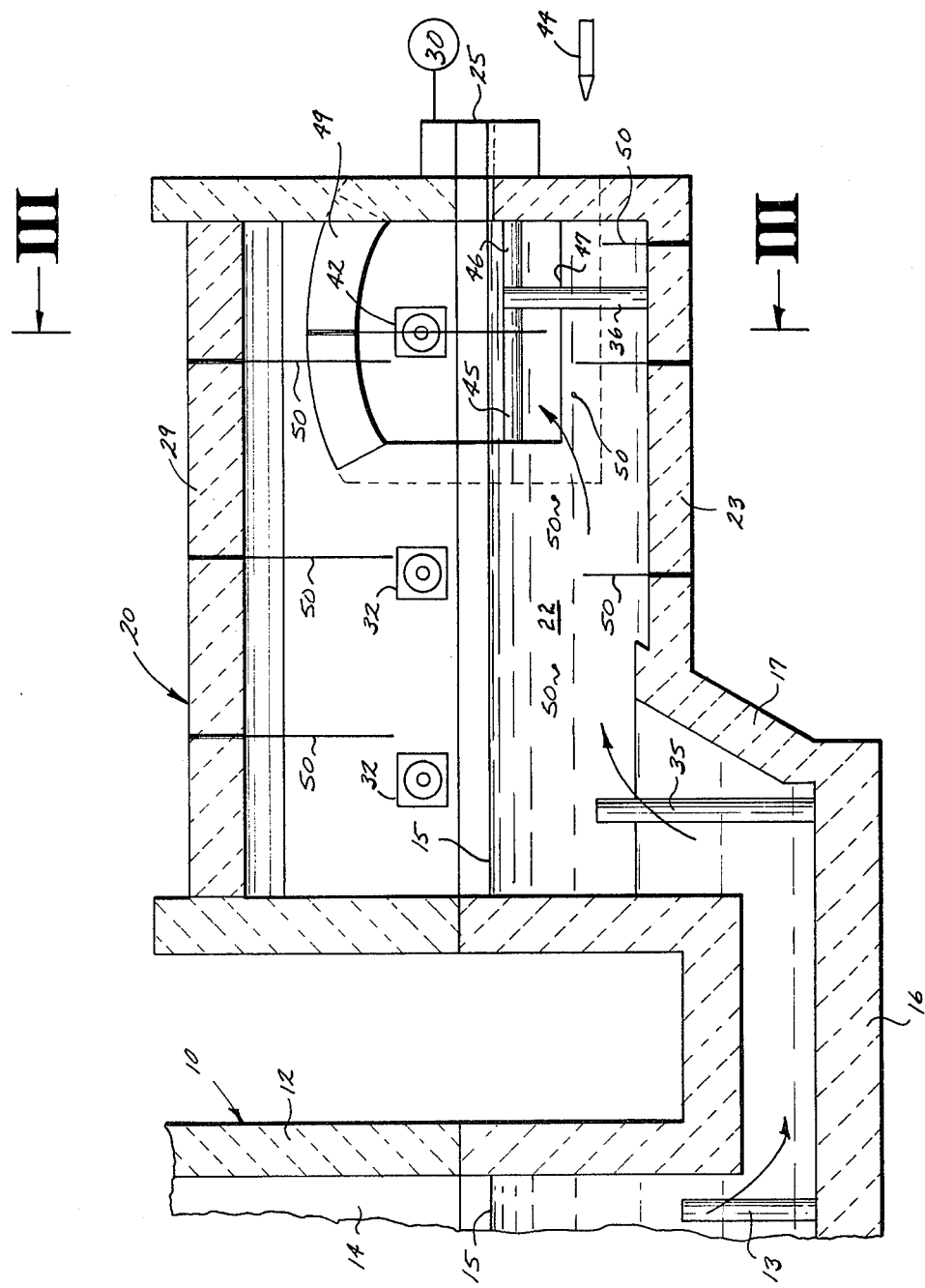
FIG. II

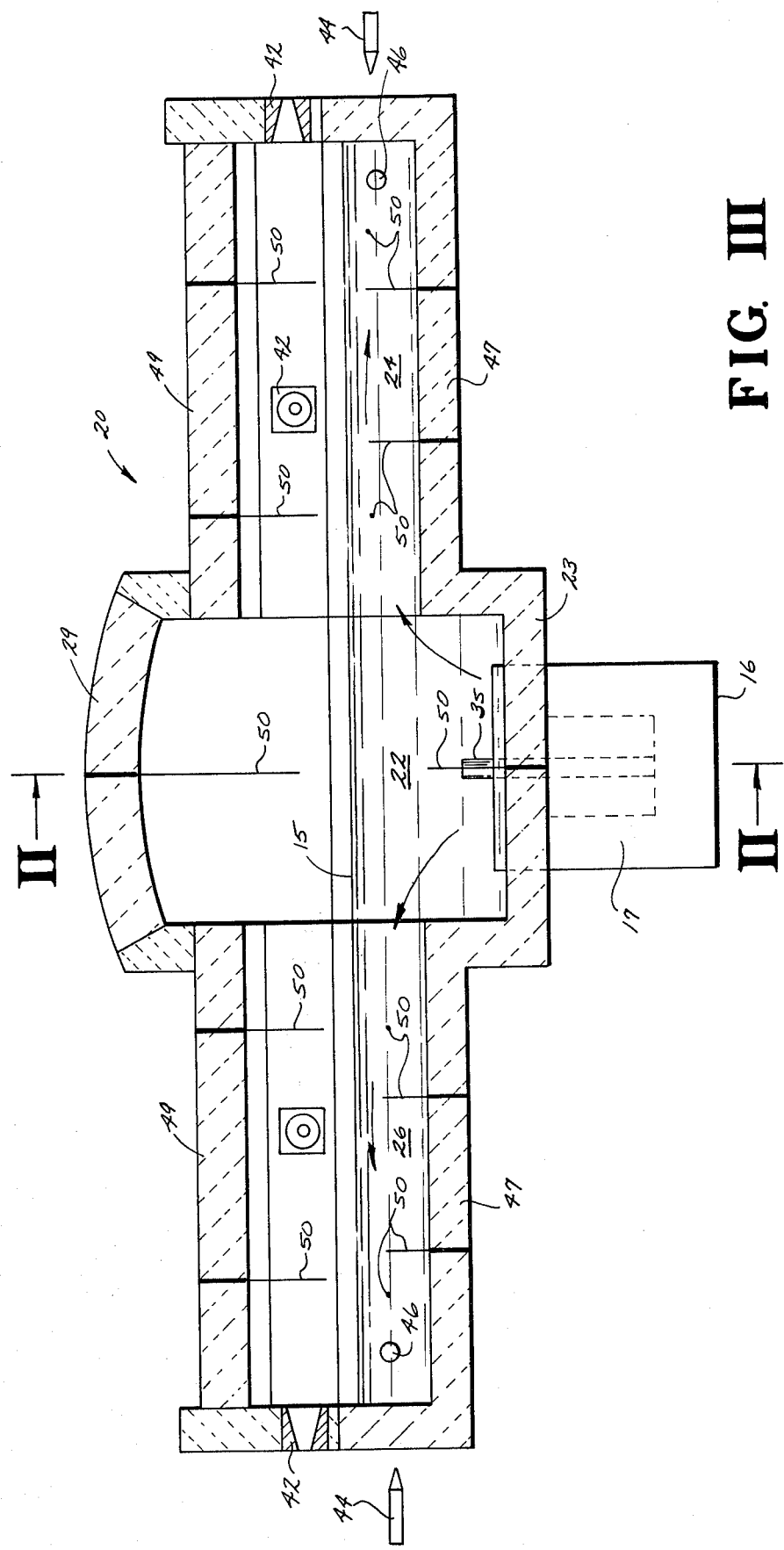
FIG. III

MOLTEN MASS TEMPERATURE CONDITIONER

BACKGROUND OF THE INVENTION

Previously a molten mass, such as of glass, from a melting furnace has been flowed into a finer or refiner comprising large containers often as wide as the furnace itself in which molten glass is refined and convection currents are produced to further refine the glass before its introduction into a forehearth leading to a glass forming machine. It is in such forehearths that burners and/or air jets have been directed onto the surface of the molten glass to control and maintain a predetermined desired temperature of the glass for its particular forming machine. Since different forming machines require different temperatures of molten glass, as well as different quantities per minute, the flow of glass from the refiner varied from one forehearth to the other, increasing the amount of energy required for maintaining the desired temperature in each of the different forehearths. This is caused by machines requiring larger quantities of glass from the refiner than other machines, which other machines then received cooler glass than they often required. Furthermore, the convection currents produced in the refiner increased the problem of maintaining uniform temperatures at its output to the forehearths, requiring still more control for the temperature in the forehearths.

More recently, glass melting furnaces have had sections in which much of the refining of the glass occurs before the glass leaves the furnace. Thus, the requirements for a larger finer outside the furnace is now no longer as essential as it previously had been. Nevertheless, the burden on the forehearths from the furnace to the machines still was great in order to properly control the temperature for each of a plurality of different glass forming machines. Thus, a large container still was provided outside the furnace for enabling different and varying flows of molten glass to the separate forehearths to each of these forming machines. This condition of the variations in flows from such a refiner is clearly illustrated in FIG. 1 of the Honis U.S. Pat. No. 2,063,842, and one means of solving this problem is disclosed therein.

Accordingly, it is an object and purpose of this invention to reduce and avoid as much as possible the undesired variations in temperature throughout a molten mass between its melting furnace and its several forming machines, as well as decrease the energy previously required for such separate temperature controls. This is particularly important today with the larger and faster glass forming machines which produce thinner glassware, thus requiring even more control of the uniformity and homogeneity of the glass fed to them.

SUMMARY OF THE INVENTION

Generally speaking, the conditioner of this invention comprises a single first larger or major chamber or zone for a molten mass, such as glass, and a plurality of second smaller or minor chambers or zones corresponding to each outlet duct to each glass forming machine supplied by the glass melting furnace, in which furnace the molten glass has been substantially refined. The larger zone may be wider and/or deeper than each of the smaller second zones, which second zones branch out from the larger zone in a sort of manifold-type configuration or finger-shaped structures in which the smaller zones are peninsular to the larger zone. In all of these zones the flow of the molten glass is substantially directly from its input to its output substantially without convection currents at any transverse location or cross-sectional area of the molten glass in the conditioner zones so that the first glass into the conditioner of this invention is substantially the first glass out of this conditioner. Thus, the temperature of each transverse cross-section of molten mass or glass in its cooling as it passes through its first and second zones is controlled both above and below the surface of the molten mass so as to produce as uniform and homogeneous a molten mass or glass as possible. The first and larger conditioner zone controls the cooling of the temperature preferably to above the highest temperature required for any one of the outlet ducts to the glass forming machines connected to the conditioner, and then the second zone further controls the cooling so as to produce a uniform temperature flow of molten glass at the output duct of the second conditioner zone corresponding to the temperature and flow requirements of the outlet duct to the glass forming machine connected to that second zone. Thus, overcooling or overheating of the melt is avoided in the conditioner for each of the separate glass forming machines connected to it.

This control is provided by heating means such as electrodes located in the conditioner below the surface of the melt in both the first larger zone and each of the separate smaller zones, as well as providing heating means such as burners or radiant elements over the surface of the melt in each of the different zones, plus the provision of cooling means such as introducing a cooling fluid into the inside or directly or indirectly contacting the outside walls of the first larger and second smaller zones of the conditioner with a cooling fluid such as air jets and/or water panels or heat sinks. These temperature-controlling means can be preset and/or automatically controlled by sensors throughout the conditioner and programmed requirements for each separate glass forming machine.

OBJECTS AND ADVANTAGES

Accordingly, it is an object of this invention to produce an efficient, effective, economic, molten mass or glass temperature conditioner between a melting furnace and a plurality of ducts to melt-forming machines.

Another object is to produce such a conditioner in which the molten mass or glass at each output duct is substantially uniform and homogeneous in temperature and composition throughout its transverse cross-sectional area.

Another object is to produce such a conditioner in which the rate of cooling of a molten mass is so controlled that as little energy as possible is required therefor.

Another object is to produce a conditioner which can supply simultaneously a plurality of outlet ducts to different fast or high volume glass forming machines with substantially uniform and homogeneous molten glass to produce thin-walled glassware at an efficient and consistent rate and quality.

A further object is to produce a conditioner in which the requirement for the substantial adjustment of the temperature of the melt in a forehearth is reduced.

Still another object is to produce a conditioner in which the temperature of the molten glass is controlled from both above and below the surface of the glass.

Still a further object is to produce a conditioner in which a plurality of different and/or varying temperatures and flows of molten glass can be produced independent of each other without one affecting the other, so that the forehearth can only be used for finally trimming the temperature of the molten glass to the machine.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. 1 is a horizontal sectional plan view of, or a view with the roof removed from, a preferred embodiment of a plural zone molten glass conditioner according to this invention;

FIG. II is a vertical sectional view taken along line II—II of FIGS. I and III of the conditioner shown therein; and FIG. III is a vertical section taken along lines III—III of FIGS. I and II orthogonal to the section of FIG. II.

DETAILED DESCRIPTION OF PREFERRED EMBODIMENT

Referring first to FIGS. I and II, there is schematically shown the outlet end wall 12 of a melting furnace 10 inside of which wall is the refining section 14 of the furnace in which the molten mass or glass level 15 is shown in FIG. II. In this embodiment the molten glass is withdrawn from the bottom of the section 14 through the duct 16 and thence into a riser 17 into the input end of the first and larger zone 22 of the conditioner 20 of this invention. Branching from this larger zone 22 there are shown in FIGS. I and III two oppositely extending smaller second zones 24 and 26, which second zones have output ducts 25 and 27 for conducting the melt or molten glass to two separate glass forming machines 30, such as through forehearths or other ducts not herein shown. Herein each of the zones of the conditioner 20 are shown to be rectangular in shape and positioned in plan in the shape of a letter "T", the central leg of which comprises the wider and deeper or larger first conditioner zone 22, while the two minor or smaller less deep and narrower second conditioning zones 24 and 26 form the arms of the "T".

Since the melt or molten glass flowing out of the furnace 10 up through the riser 17 must have its temperature controlled, its rate of flow through the first larger conditioner zone 22 is reduced sightly from that through the duct 16 and riser 17 by the larger vertical cross-sectional area of the zone 22. However, this larger zone 22 must directly and continuously supply the molten mass or glass into two or more separate smaller and second conditioner zones, such as zones 24 and 26, and accordingly their vertical cross-sectional areas are correspondingly smaller than that of the first zone 22.

In order to control the temperature uniformly and also the homogeneity of the molten mass or glass, both vertically and horizontally transverse of the normal predominant and direct liquid flow of melt or molten glass through the conditioners 20 as shown by the arrows in the figures, there are not only provided gas burners 32 in the parallel side walls 21 of the first and larger zone 22, but also these walls may be cooled by fluids from the outside, such as air through adjustable and movable jets 34, as shown in FIG. I. These air or cooling jets 34 preferably are located below the liquid level 15 in the conditioner 20. Further temperature control below the molten liquid level is provided by electrodes 35 and 36 at opposite ends of the larger zone 22, which electrodes protrude through the bottom wall 23 thereof. The former one of these electrodes 35 may be located in the bottom of the riser 17 and also be used in combination with an electrode 13 in the fining zone 14 in the furnace 10 at the other end of the outlet duct or neck 16 to help maintain the fluidity of the melt flowing through the duct 16. Similarly, each of the second zones 24 and 26 may have along their side and end walls burners 42 and against the outside of their side and end walls 41, 43 and 51 fluid cooling means such as adjustable or movable air jets 44. Furthermore, projecting inwardly from the side walls 41 and 51, or upwardly through the bottom wall 47, near opposite ends of the second or smaller zones 24 and 26, are electrodes 45 and 46.

Whether or not and when each of the temperature controlling means, such as the heating means or burners 32, 42, and electrodes 35, 36, 45, 46, and cooling means or jets 34 and 44 are used and for now long and with what strength, depends upon whether the rate of cooling of the melt or molten glass as it flows in the direction of the arrows through the conditioner 20 approximates the desired temperature gradient through the conditioner to produce the desired uniform temperature throughout the cross-sectional area of the melt or molten glass flowing out through the outlet ducts 25, 27. This control produces a substantially homogeneous molten mass or glass passing through the ducts 25 and 27. In order to aid in controlling the cooling of the melt in the conditioner 20, temperature sensors 50 may be employed projecting into and above the melt from through the wall and arched roofs 29 and 49 of the first zone 22 and second zones 24 and 26, respectively. Thus, there are provided a plurality of different types of heating and cooling means both above and below the surface of the molten mass in each of the separate zones 22, 24, and 26 of the conditioner 20 of this invention, to minimize convection currents in each zone and insure homogeneity of the melt.

It is to be clearly understood that other types of heating means and cooling means may be employed in the conditioner of this invention than those shown herein, including thinner walls 21, 41, 51 and/or movable water jackets on the outside walls of the conditioner zones. Even gas jets or burners may be provided under the liquid level 15 in the conditioner zones. Furthermore, the shape and location of the conditioner zones may be varied as desired and need not be rectangular and T-shaped as shown, but may have other manifold and/or curvilinear-shaped plans, provided of course the primary or larger zone 22 is designed sufficiently large with respect to the plurality of second zones, so as to supply each second zone outlet with its necessary flow rates and uniform temperature.

While there is described above the principles of this invention in connection with specific apparatus, it is to be clearly understood that this description is made only by way of example and not as a limitation to the scope of this invention.

We claim:

1. In a glass forming plant having a furnace for supplying molten and refined glass and a plurality of glass forming machines, each machine having its own forehearth, the improvement comprising a molten glass temperature conditioner between said furnace and said forehearths, said conditioner comprising:
(a) a primary temperature controlling chamber,
(b) a plurality of secondary temperature controlling chambers branching from said primary chamber and connected to each forehearth,
(c) heating means above and below the surface of the molten glass in each chamber,
(d) temperature sensing means above and below the surface of the molten glass in each chamber, and
(e) means to control the relative heat input of said heating means by said sensing means to maintain the temperature required for the inlets to each associated forehearth.

2. A conditioner according to claim 1 wherein said primary chamber is larger in volume than any one of said secondary chambers.

3. A conditioner according to claim 1 wherein said heating means includes burners.

4. A conditioner according to claim 1 wherein said heating means includes electrodes.

5. A conditioner according to claim 1 wherein said chambers have walls and at least one of said chambers is associated with a fluid means for cooling at least one of said walls controlled by said sensing means.

6. A conditioner according to claim 1 wherein at least one of said chambers has parallel walls.

* * * * *

UNITED STATES PATENT AND TRADEMARK OFFICE
CERTIFICATE OF CORRECTION

PATENT NO. : 4,424,071
DATED : January 3, 1984
INVENTOR(S) : William R. STEITZ et al It is certified that error appears in the above-identified patent and that said Letters Patent are hereby corrected as shown below:

Column 4, line 23, change "now" to -- how --.

Signed and Sealed this

First Day of May 1984

[SEAL]

Attest:

GERALD J. MOSSINGHOFF

*Attesting Officer*  *Commissioner of Patents and Trademarks*